Jan. 10, 1961  K. V. CUSHMAN  2,967,593
STRUCTURAL SPACER
Filed Jan. 29, 1958  2 Sheets-Sheet 1

KENNETH V. CUSHMAN,
INVENTOR.

HERZIG & JESSUP,
ATTORNEYS.

Jan. 10, 1961 K. V. CUSHMAN 2,967,593
STRUCTURAL SPACER
Filed Jan. 29, 1958 2 Sheets-Sheet 2

KENNETH V. CUSHMAN,
INVENTOR.

HERZIG & JESSUP,
ATTORNEYS.
BY

United States Patent Office 2,967,593
Patented Jan. 10, 1961

2,967,593
STRUCTURAL SPACER

Kenneth V. Cushman, Whittier, Calif., assignor to The Delron Company, Inc., South Gate, Calif., a corporation of Nevada Filed Jan. 29, 1958, Ser. No. 712,003

10 Claims. (Cl. 189—34)

This invention relates to a structural spacer and more particularly to a spacer for reinforcing an opening in a relatively fragile wall of lightweight construction which in itself is insufficient in structural strength to support a fastener or the like.

In many instances where a lightweight wall is desired, a cellular wall of light gauge material is used, such walls being advantageously constructed of a pair of spaced skins or sheets of material which are laminated to a relatively fragile core of transversely honeycombed, fluted or pleated thin gauge material sandwiched between the skins. A wall of this construction, while meeting the specification of an application, is necessarily insufficient in mass and structural strength to self-support any objects which may desirably be attached thereto. A fastener which is used in an opening provided for this purpose in the wall generally tends to tear and enlarge the opening under vibration or stress and therefore weakens the wall, whereby objects which have been attached thereto become separated or loosened. Likewise, if the wall is to be mounted at a desired location, a bolt or rivet extending through an opening provided in the wall may quickly enlarge the hole or opening during the use of the wall, due to wear or vibration or the like, whereby the wall may become unsecured from its mounting, the opening becoming enlarged excessively to a point where the wall is weakened and impractical to use.

A more desirable and feasible method of mounting the wall and/or mounting objects to the wall, and therefore an object of this invention, is to provide a new and improved structural spacer which reinforces an opening in a relatively fragile wall by providing a substantially rigid liner for the opening while providing additional structural strength to the wall.

A more specific object of this invention is to provide a new and improved structural spacer which, when assembled, provides a relatively rigid liner to reinforce an opening in a relatively fragile wall yet which grips or clamps the outer skins of the wall to strengthen and reinforce the wall and transmit any stresses in the outer skins through one skin and/or from one skin to the other.

It is another object of this invention to provide a new and improved structural spacer which is economical to manufacture and capable of mass production and interchangeability of parts thereof.

It is a further object of this invention to provide a new and improved structural spacer which is readily and quickly installed in a relatively fragile wall without the necessity of highly skilled labor or special equipment and tools.

A still further object of this invention is to provide a new and improved structural spacer which may be readily supplied in varied forms for various applications, for example, for use with a through-bolt or rivet or the like, as a blind bore wherein the bolt does not extend entirely through the wall or panel, or as a journal for a shaft, rod, or the like.

A general object of this invention is to provide a new and improved structural spacer which overcomes disadvantages of prior means and methods heretofore intended to accomplish generally similar purposes.

These and other objects of this invention will be more readily apparent to one skilled in the art from the following detailed description of the drawings, wherein.

Figure 1:
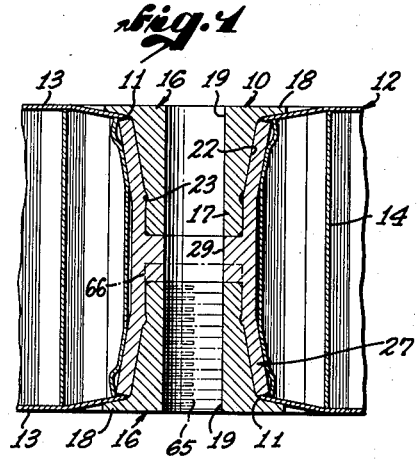
Fig. 1 is a vertical sectional view, of a structural spacer in accordance with this invention, as assembled and installed within a relatively fragile wall.
Figure 2:
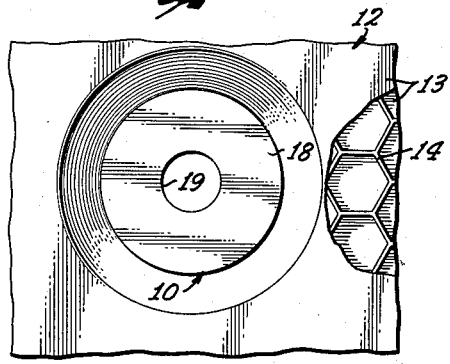
Fig. 2 is a top plan view, in elevation, of the structural spacer and wall shown in Fig. 1, a portion thereof being broken away for clarity.

Referring to the drawings, and more particularly to Figs. 1 through 5, there is shown by way of illustration but not of limitation, a structural spacer indicated generally by the numeral 10 for reinforcing an opening 11 in a relatively fragile wall 12.

The wall 12 herein illustrated may be of any of the varied forms of laminated and cellular construction commonly used where a relatively lightweight wall is desired, and is particularly described in this specification as a means of illustrating the invention. The wall 12 is shown comprising a pair of spaced sheets or plates 13 which are laminated or fixed in a suitable manner to an inner core 14 of honeycombed, ribbed, fluted or other cellular construction. The outer skins 13 and inner core 14 generally consist of like material, that is, the skins and core may be made of a thin gauged metal sheet, such as aluminum or the like, or of resin impregnated glass fibre cloth. Due to the thin gauge or thickness of the materials used in the construction of the wall, when an opening indicated at 11, is formed in the wall any stress applied to one of the skins or both may tend to enlarge the opening 11. A fastener or shaft or the like extending through the opening may tend to tear or otherwise distort the opening, rendering it ineffective for use for mounting, or as a journal.

The structural spacer 10 includes a pair of spacer sections or plugs 16, each having a tubular shank 17 and an enlarged flange 18 at one end thereof. Each spacer section is provided with a longitudinal passage or bore 19 extending therethrough. The outer surface of each shank 17 preferably includes a cylindrical portion 21 adjacent the end opposite the flange 18 and a tapered or conical portion 22 tapering outwardly from the cylindrical portion 21 to the flange 18. An annular groove 23 forms a depression of the outer surface at the circumferential, intermediate intersection of the cylindrical surface 21 and the conical surface 22 for a purpose which will be hereinafter described.

The spacer sections or plugs 16 reside within the opening 11 of the wall 12 with the flanges 18 thereof in contact with the outer surface of the skins 13 of the wall to sandwich the wall 12 therebetween. If a flush installation of the spacer is desired, that is, when the outer surfaces 24 of the plugs 16 are desired to be substantially flush with the outer surfaces of the skins 13, the inner surface 26 of the flange 18 is preferably of a tapered or conical configuration to impart a dimpling effect to the skins 13 of the wall 12 when the spacer is completely installed in the wall. The conical surfaces 22, at the circumferential intersection with the conical surface 26 of the flange 18 are preferably slightly smaller than the diametrical dimension of the opening 11.

The spacer 10 further includes a tubular sleeve section 27 which is disposed within the opening 11 of the wall and preferably has an outer diametrical dimension equal to or slightly smaller than the opening 11 of the wall. The sleeve section 27 is provided with a pair of oppositely extending, longitudinal, enlarged bores 28 which are interconnected by a reduced longitudinal bore 29 forming oppositely facing shoulders 31. The shoulders 31 form abutments for the inner end 32 of each plug 16, thereby limiting inward movement of the plugs. The reduced bore 29 is preferably diametrically complementary to the bores 19 of the plugs 16 and thereby form a contiguous passage extending through the spacer 10 when fully assembled. The resultant outer annular walls 33, formed by the enlarged bores 28 and the outer surface of the sleeve 27 are preferably thin enough and sufficiently malleable to be expanded over the shanks 17 without rupturing or splitting the walls 33 during assembly of the sleeve and the plugs 16.

Figure 3:
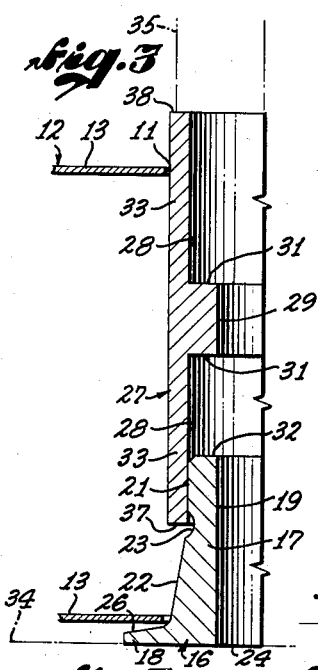
Fig. 3 is an enlarged, fragmentary, sectional view illustrating the initial step in the installation of the above spacer within the wall.

Referring to Fig. 3, there is shown a stage of the assembly of the spacer 10 which is anticipated as to be the most practical way to ship a spacer to the user. More specifically, one of the plugs 16 is preferably telescoped within the annular wall 33 of the sleeve 27, as indicated in this figure, wherein the cylindrical surface 21 resides within the enlarged bore 28. When the user wishes to install the spacer within the wall 12, the subassembly of the sleeve and one of the plugs is inserted through the opening 11 of the wall 12. The wall 12 is then preferably placed upon a flat surface such as an anvil, plate or the like, indicated by the broken lines 34. A suitable shouldered or flat-faced tool indicated in broken lines 35 may then be placed against the opposite end 38 and/or the shoulder 31 of the spacer 27 and hammered or pressed downwardly until the shank 17 is forced further into the enlarged bore 28 and the annular wall 33 is expanded for a portion thereof indicated at 36 over the conical portion 32 of the plug 16. The length of the annular skirt 33 is preferably of such dimension as to effect an abutment of the lower end 37 of the sleeve 27 against the inner surface of the lower skin member 13 against the flange 18 and clamp the skin 13 between the sleeve end 37 and the inner surface 26 of the flange 18 in a tight gripping engagement as indicated in Fig. 4.

The other plug 16 is then telescoped within the upper enlarged bore 28 by any convenient means, such as by tapping with a hammer or by pressing with a press or the like, to force the plug 16 and its inner end 32 into abutment with the other outwardly facing shoulder 31 of the sleeve 27. This action spreads or expands the upper portion or annular wall 33 of the sleeve 27 similarly to the previously described lower wall 33 as expanded over the lower plug. The length of the sleeve 27 is likewise preferably of such length as to clampingly engage and grip the opposite skin member 13 of the wall 12 between the opposite sleeve end and the inner surface 26 of the other plug member 16.

Figure 4:
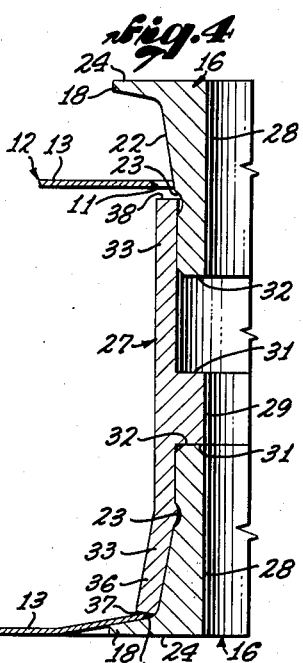
Fig. 4 is an enlarged, fragmentary, vertical, sectional view illustrating a successive step in the installation of the spacer within the wall.
Figure 5:
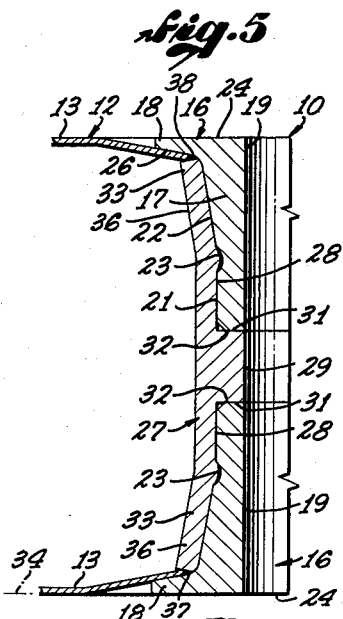
Fig. 5 is an enlarged, fragmentary, vertical, sectional view similar to Figs. 3 and 4, illustrating the structural spacer as seen when the installation is completed.

Referring to Fig. 4, the upper plug 16 is shown in position with its shank 17 telescoped within the enlarged bore 28 in a position where the plug is started in the sleeve. A shouldered or other tool is then directed against the outer surface 24 of the plug and flange to force the plug inwardly into the enlarged bore 28 thereby expanding the annular wall 33 of the upper portion of the sleeve over the conical portion 22 of the plug 16 until the flange 18 and the upper end 38 of the sleeve clamp the upper skin member of the wall 12 therebetween.

As the annular walls 33 are expanded over the conical sections 22, a relatively small portion of the sleeve material is caused to flow into the groove 23 of the plug 16. This flow of metal forms a key within the groove to interlock the spacer sections 16 to the sleeve 27 and prevent inadvertent loosening of the plug sections and the sleeve while the wall 12 is transported to its place of use, or before parts such as brackets or the like are attached thereto. It is of course understood that such clinching, clamping, or keying of the pieces or sections 16 and sleeve 27 together may form a permanent attachment for re-use of the spacer within the opening. However, the primary purpose of the interlocking is to retain the sleeve 27 in tight engagement with the skin members 13 until the assembly or attachment of parts is completed whereby the fastener (not shown) tends to hold the plugs and sleeve in proper relationship.

Referring to Figs. 6–9, modified embodiments of this invention are illustrated to exemplify varied forms which are typical but not limitations of adaptations readily inheritable of the instant invention, wherein like parts are referred to by like numbers.

Figure 6:
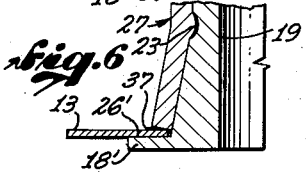
Fig. 6 is an enlarged, fragmentary, vertical, sectional view illustrating a modified embodiment of spacer in accordance with this invention.

Referring particularly to Fig. 6, a slight modification of the plug 16 is illustrated, wherein the flange 18′ is shown as having a flat inner surface 26′ for use in an installation where a flush assembly is not required. The inner surface 26′ and an end 37 of the sleeve 27 engage a skin 13 to clamp the skin therebetween as previously described in the foregoing description.

Figures 7, 8, 9:
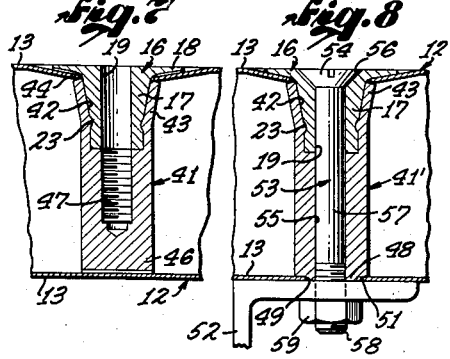
Fig. 7 is a vertical, sectional view illustrating a third embodiment of this invention, as adapted for use as a blind hole installation.
Fig. 8 is a vertical, sectional view, with parts shown in elevation, illustrating a fourth embodiment of this invention.
Fig. 9 is a vertical, sectional view, with parts shown in elevation, of a fifth embodiment of this invention.

Referring to Fig. 7, a blind spacer installation is illustrated wherein a plug 16 having a tubular shank 17 and an enlarged flange 18 is telescoped within a socket member 41, the shank 17 residing within an enlarged bore or socket 42 provided in an end thereof adjacent the plug 16. The socket member 41 may be of any desired outer configuration and preferably provides a relatively thin annular wall 43 substantially coaxial to and surrounding the enlarged bore 42 for expansion over the conical surface of the plug 16, similarly to the annular walls 33, to provide a clamping engagement between the upper end 44 of the socket member and the inner surface of the plug for the upper, outer skin 13. A layer of adhesive is preferably applied between the inner surface 26 of the flange 18 and the skin member 13 to increase the gripping action on the skin 13.

The socket member 41 in this instant embodiment is preferably of such a length as to extend substantially adjacent the inner surface of the opposite skin member 13, and a layer of adhesive is preferably applied between the lower end 46 of the socket member 41 and the skin member 13 to reinforce the skin at this point and provide an additional gripping action. A flow of material of the annular wall 43 into the groove 23 of the plug member 16 is similarly effected to interlock the plug member 16 with the socket member 41. The plug member 16 preferably includes a longitudinal bore 19 extending therethrough and the socket member may be provided with a blind, tapped bore 47 contiguous with the bore 19 when the spacer is assembled. When a bolt or the like is used to attach a bracket or the like to the skin member or to attach the wall to another member, the torque placed on the tapped bore 47 will tend to tighten the engagement between the upper end 44 and the inner surface 26 of the flange 18 against the skin member 13.

In the embodiment illustrated in Fig. 8, a plug member 16 resides with its shank 17 telescopically engaging the socket 42 of a socket member 41' similarly to the embodiment shown in Fig. 7. In this instant embodiment, the lower end includes a reduced portion 48 complementarily to and residing in a reduced opening 49 of the lower skin 13. The reduced end 48 forms a shoulder 51 on the lower end of the socket member 41' against which the lower skin 13 may be clamped when a bracket 52 is mounted to the wall 12. In this embodiment, the socket member 41' preferably includes a longitudinal bore 55 extending therethrough and complementary to the bore 19 of the plug member 16 to receive a fastening member 53. If a flush installation is desired, a counter-sunk head 54 as illustrated may be provided on the fastener 53 which resides in a counter-sunk portion 56 of the bore 18, the shank 57 of the fastener extending through the bore 19 and the bore 55 of the socket member 41' and a threaded end 58 of the fastener extending outwardly therefrom. The bracket 52 is then secured in place as by a nut 59. In this instant embodiment, the annular wall 43 is expanded over the shank 17 of the plug member, as previously described in the previous embodiments, whereby the upper end of the socket member 41' and the inner surface of the flange 18 of the plug member clampingly engage the upper skin member 13 of the wall 12 therebetween.

Referring to Fig. 9, a further embodiment of this invention is illustrated, wherein the enlarged head 54 of the fastener 53 functions to clamp the upper skin 13 to the socket member 41". In this instant embodiment, the plug 16 is installed similarly to the previously described embodiments wherein the shank 17 is inserted into the socket 42 to expand the annular wall 43 into a clamping engagement with the lower skin 13 against the flange 18. A conical or counter-sunk seat 61 may be provided in the opposite end of the socket member 41" and continuous with the longitudinal bore of the socket member in which the head 54 of the fastener 53 may reside in clamping engagement with a portion of the skin 13. The opening 62 of the upper skin 13 is preferably complementary to the outer diameter of the shank of the fastener 53 whereby the skin 13 is dimpled as at 63 by the head 54. A dimple 63 may optionally be preformed. The bracket 52 may then be secured to the wall 12 and the spacer by means of a nut 59. It is of course to be understood that a rivet or other fastening means may be substituted for the fastener 53 described, wherein a flat, rounded, counter-sunk or other enlarged head may be utilized as desired.

Referring to Fig. 1, it is to be understood that although longitudinal passages 19 are described as extending through the plug members 16 and communicating with the reduced bore 29 of the sleeve member 27, one or the other bores 19 may be optionally provided with internal threads whereby a bolt or other threaded member may extend through a bore 19 of one plug member 16, the bore 29, and be threaded into the threaded portion indicated in broken lines 65 of the other plug member. This type of construction may be preferred where it is desired to use one of the plug members as a nut member. Also, if it is desirable, an annular recess or groove 66 may be provided in the sleeve member 27 in which a ring or washer of fibrous or other material may be mounted to form a locking member when engaged by a bolt or other threaded member.

Figure 10:
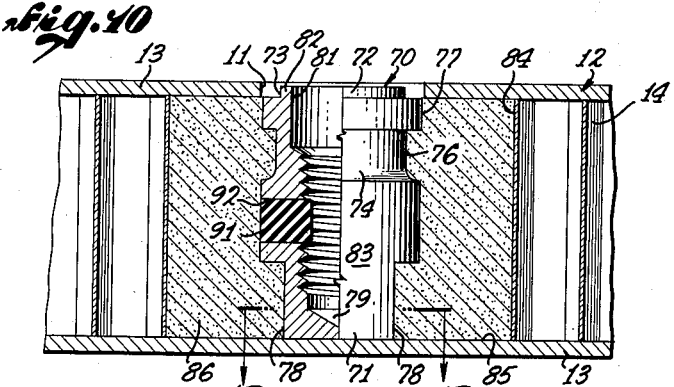
Fig. 10 is a vertical sectional view, with parts shown in elevation of a further embodiment of this invention, illustrating the initial stage of installation.
Figure 11:
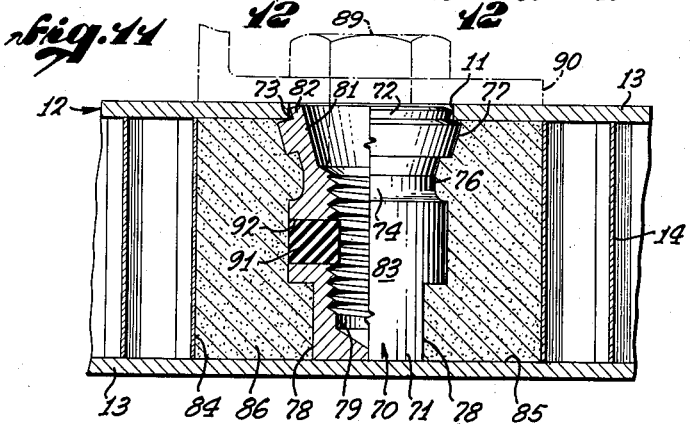
Fig. 11 is a vertical sectional view, with parts shown in elevation, of the embodiment shown in Fig. 10, illustrating the spacer in its final stage of installation.
Figure 12:
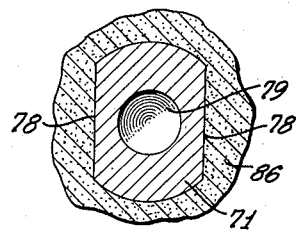
Fig. 12 is a fragmentary horizontal sectional view as taken on a line 12—12 of Fig. 10.

Referring to Figs. 10, 11 and 12, a further embodiment of this invention is illustrated, the instant embodiment being adapted for use in a blind type of installation, and being adapted to be expanded for retention within a blind hole of a cellular wall of the character previously described.

The spacer 70 of the instant embodiment comprises a body 71 which is illustrated as having a generally cylindrical outer configuration, having a circumferentially relieved upper portion 72 to form a shoulder 73 adjacent the upper end. The body 71 further includes a second circumferentially relieved portion 74, spaced inwardly from the upper end of the body, and forming an annular groove 76 and an annular land 77. The lower end of the body 71 is preferably transversely relieved to form a non-circular configuration such as flat portions 78 for a purpose to be described. An axial, blind bore 79 extends from the upper portion of the body 70, to an area adjacent the lower or inner end thereof and is enlarged as at 81, at its outer or upper end, to form an annular wall 82 at the upper portion of the body. The lower portion of the bore 79 is preferably threaded to receive a bolt 89, indicated by broken lines.

The over-all length of the body 70 is preferably of such dimension that when inserted into the wall 12, the lower end of the body is in abutment with the inner surface of the lower outer skin 13, and the outer or upper end of the body is flush with or slightly below the outer surface of the upper skin 13 of the wall. The shoulder 73, formed by the upper surface of the land 77 and the circumferentially relieved portion 72 of the body, is preferably substantially aligned with the inner surface of the upper skin 13.

An aperture 11 is provided in the upper skin 13 of the wall 12 and is preferably equal to or slightly larger than the outer diameter of the spacer 70, that is, the external surfaces of the unrelieved portions 77 and 83 which comprise the largest outer diameter of the body. The wall 12 is counter-bored as indicated at 84 to form an enlarged cavity in the inner core 14 of the wall 12, thereby forming an annular space 85 surrounding the spacer 70. The cavity 85 preferably extends from the inner surface of the upper skin 13 to the inner surface of the lower skin 13 of the wall 12.

Figure 13:
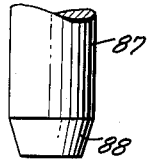
Fig. 13 is a fragmentary view, in elevation, of the lower portion of an expansion tool suitable for use in connection with the installation of the structural spacer of the latter embodiment.

The annular space 85 is filled with a suitable temperature-setting, metal-bonding, compound 86. The spacer 70 is then inserted through the aperture 11 into the compound-filled cavity 85 until the lower end of the body 70 rests on the lower skin 13 of the wall 12. The compound 86 enters the groove 76 and spaces formed by the relieved portions or flats 78 as the spacer is inserted and is preferably of a type which sets at room temperature. Before the compound completely sets, the upper annular wall 82 of the spacer 70 is expanded by suitable means until the shoulder 73 is caused to engage the inner surface of the skin 13 at the aperture 11, the relieved portion 72 extending within the aperture 11, to lock the spacer within the wall 12. A suitable expansion tool 87 is illustrated in Fig. 13, which includes a lower frusto-conical surface 88 adapted to expand the annular wall 82 when the tool 87 is forcibly inserted to a depth corresponding to the depth of the enlarged bore portion 81.

Alternatively, a suitable instrument (not shown), having a retractable threaded shank, adapted to engage the threaded bore 79, and a coaxial conical expansion sleeve, similar in configuration to the taper 88 of the tool 87, may be used to expand the upper annular wall 82, whereby the threaded shank may be hydraulically or pneumatically withdrawn into the instrument while the conical sleeve enters the enlarged bore 81 to expand the wall 82 and locate the shoulder 73 in contact with the edge of the opening 11. This instant method is advantageous inasmuch as it enables installation of the spacer in the wall at the location of assembly before or after the wall has been installed.

Also optionally, a bolt (not shown) having an enlarged frusto-conical shank portion, conforming in configuration to the taper 88, may be used to expand the wall 82 after a threaded portion of the bolt engages the threaded bore 79.

When a fastening means such as the bolt 89 is employed to fasten an object, such as a bracket 90, indicated in broken lines, to the wall 12, the bolt 89 serves to clamp the upper skin 13 between the bracket 90 and the shoulder 73 to form a firm engagement with the wall 12, thereby reinforcing the opening in the wall. The compound 86 assists in retaining the spacer 70 within the wall 12 by gripping the spacer within the groove 76, and prevents rotation of the spacer by gripping the non-circular portion of the body as at the flats 78.

If desired, a locking means may be provided to prevent inadvertent loosening of the bolt 89 within the threaded bore 79, and means comprising one or more cylindrical or otherwise shaped plugs 91 disposed as in correspondingly shaped transverse bores 92 of the body 70, intermediate of the threads of the bore 79. The plug 91 may be of any suitable yieldable material such as nylon, Teflon, or the like, which will deform in accordance with the threads of the bolt 89, when the bolt 89 is installed, and form a gripping action thereon to prevent the bolt from inadvertent rotation.

In general, this invention comprises one or more spacer sections or plugs each having an enlarged head and a tubular shank, such shank including an outer surface having a portion thereof of a cylindrical configuration and an intermediate portion thereof adjacent the flange or enlarged portion of a conical configuration. A sleeve or socket member is provided with a socket to receive the shank of the spacer section or plug, and clamp, between an end of the sleeve or socket member and the inner surface of the enlarged head or flange of the plug member, a portion of the outer skin adjacent the opening through which the plug member is inserted to secure the spacer to the skin. The opposite end of the socket member may be similarly secured to the opposite skin member of the wall which forms the opposite outer surface of the wall.

The opposite end of the socket member may be optionally secured to the opposite skin as by means of a layer of adhesive or the like placed therebetween, or by the clamping action of the fastener means which is employed within the passage formed within the spacer. Means are preferably provided, cooperating between the plug and the sleeve or socket member to interlock said members. This interlocking means is preferably in the form of an annular groove, provided on the outer surface of the shank of the plug member, into which a portion of the sleeve or socket member material may be caused to flow during the assembly thereof to form an interlocking engagement between the plug member and the socket member and thereby prevent loosening or dislodgment of the component parts.

If desired, the plug member may be omitted, and other suitable means provided for expanding the portion of the spacer adjacent the skin of the wall to engage the skin of the wall and thereby retain the spacer within an opening of the wall. Also, if desired, the opening in the wall may be internally enlarged to form an annular space surrounding the spacer after insertion in the wall, and a suitable temperature-setting, metal-bonding compound filled within the annular space to assist retention of the spacer within the opening and in cooperation with a non-circular portion of the spacer, keep the spacer from rotating within the opening.

While I have herein shown and described what I conceived to be the most desired embodiments of my invention, it is to be understood that alterations and modifications may be made in a manner to satisfy the spirit of my invention which is intended to comprehend any and all equivalent devices as comprehended in the following claims.

What I claim as new and desire to secure by Letters Patent is:

1. A structural spacer, comprising; a generally cylindrical body of malleable metal having at least one end thereof formed as a peripheral continuous hollow tubular portion, a clamping element having a cylindrical portion slidably guided in the interior of said tubular portion, a conical portion flaring outwardly from said cylindrical portion, and a flange-like head extending laterally from the outer end of said conical portion, the diameter of said conical portion adjacent said head being substantially equal to the outer diameter of the outer end of said hollow tubular portion.

2. A structural spacer as defined in claim 1 wherein said clamping element is provided with a circumferential groove substantially at the juncture of said cylindrical and conical portions.

3. A structural spacer as defined in claim 1 wherein said body is provided with a peripherally continuous tubular portion at each of its ends, there being a clamping element for each of said tubular portions.

4. A structural spacer as defined in claim 1 wherein said clamping member is provided with an axial bore therethrough for receiving means for forcing said member into said body.

5. A structural spacer as defined in claim 1 wherein said flange-like head is provided with a shallow conical outwardly flaring annular surface adjacent said conical portion.

6. In combination, a structural spacer and a wall having spaced outer layers of thin fragile material, said spacer comprising; a spacer body of malleable metal between said outer layers and bearing at its ends against the inner faces of said layers, an opening through at least one of said layers in concentric alignment with said body, the portion of said body adjacent said opening being of circumferentially continuous hollow tubular form and flared laterally to underlie the periphery of said opening; and a clamping member complementary to and frictionally held in the interior of said hollow tubular portion and holding the same in said flared condition, said clamping member extending outwardly through said opening and having a laterally extending head engaging the outer surface of said one layer and clamping the same against the end of said flared portion around the entire periphery of said opening.

7. The combination defined in claim 6, including; a circumferential groove in said clamping member substantially at the inner end of said flared portion, a portion of the metal of said body extending into said groove to assist in locking said clamping member in position.

8. The combination of claim 6 wherein each end of said body comprises a circumferentially continuous and flared tubular portion, each of said layers having one of said openings therethrough; and there being one of said clamping members at each of said ends.

9. The combination of claim 6 wherein said clamping member is provided with an axial bore therethrough; and holding means extending through said bore and further securing said clamping member in place.

10. The combination of claim 6 wherein said head is provided with an inwardly tapered circumferential conical surface engaging an inwardly dimpled portion of said one layer, the outer end of said head being flat and substantially flush with the outer surface of said one layer.

References Cited in the file of this patent

UNITED STATES PATENTS

| Number | Name | Date |
|---|---|---|
| 1,835,243 | Schaffert | Dec. 8, 1931 |
| 1,893,481 | Adams | Jan. 10, 1933 |
| 2,334,773 | Johnson | Nov. 23, 1943 |
| 2,372,485 | Griffin | Mar. 27, 1945 |
| 2,700,172 | Rohe | Jan. 25, 1955 |
| 2,767,877 | Newsom | Oct. 23, 1956 |
| 2,779,979 | Sundelin | Feb. 5, 1957 |
| 2,784,636 | Bohmer | Mar. 12, 1957 |
| 2,808,136 | Hammitt | Oct. 1, 1957 |

FOREIGN PATENTS

| Number | Country | Date |
|---|---|---|
| 622,537 | Germany | Nov. 30, 1935 |